(12) United States Patent
Knox

(10) Patent No.: US 7,024,078 B2
(45) Date of Patent: Apr. 4, 2006

(54) FIBER DEVICE WITH HIGH NONLINEARITY, DISPERSION CONTROL AND GAIN

(75) Inventor: Wayne H. Knox, Pittsford, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 10/978,357

(22) Filed: Nov. 2, 2004

(65) Prior Publication Data

US 2005/0094941 A1  May 5, 2005

Related U.S. Application Data

(60) Provisional application No. 60/516,299, filed on Nov. 3, 2003.

(51) Int. Cl.
G02B 6/26 (2006.01)
C03B 37/15 (2006.01)
H04J 14/02 (2006.01)

(52) U.S. Cl. .................... 385/43; 385/42; 385/27; 385/11; 65/406; 65/408; 398/81

(58) Field of Classification Search .............. 385/43, 385/42, 27, 28, 11; 65/406, 408; 398/79, 398/80, 81
See application file for complete search history.

(56) References Cited

U.S. PATENT DOCUMENTS

| 5,479,546 | A | * | 12/1995 | Dumais et al. | 385/43 |
| 5,710,848 | A | * | 1/1998 | Dumais et al. | 385/43 |
| 5,805,751 | A | * | 9/1998 | Kewitsch et al. | 385/43 |
| 6,169,830 | B1 | * | 1/2001 | Kewitsch et al. | 385/37 |
| 2004/0028356 | A1 | * | 2/2004 | Birks et al. | 385/122 |
| 2005/0094941 | A1 | * | 5/2005 | Knox | 385/43 |

OTHER PUBLICATIONS

"Generation of a Broadband Continuum with High Spectral Coherence in Tapered Single-Mode Optical Fibers", F. Lu, University of Rochester, Rochester, New York, 14620.

"Linear and Nonlinear Properties of Tapered Single-Mode Optical Fibers", F. Lu, University of Rochester, Rochester, New York, Apr. 7, 2003.

"Generation of a Broadband Continuum with High Spectral Coherence in Tapered Single-Mode Optical Fibers", F. Lu, et al., University of Rochester, Rochester, New York, Jan. 26, 2004, vol. 12, No. 2, Optical Express.

* cited by examiner

Primary Examiner—Brian M. Healy
(74) Attorney, Agent, or Firm—Blank Rome LLP

(57) ABSTRACT

An optical fiber is tapered, for example, by heating it with a $CO_2$ laser. The tapering process is controlled such that the taper transition regions have taper angles selected to minimize loss. The taper waist has a diameter selected to introduce desired dispersion properties and desired nonlinearity. The optical fiber can be used as a dispersion compensator in a fiber laser or other fiber optic system. The nonlinearity in the tapered optical fiber allows the generation of ultrashort light pulses.

36 Claims, 4 Drawing Sheets

Heat Absorption >> Dissipation

Heat Absorption = Dissipation untapered fiber    taper waist    untapered fiber

FIBER DEVICE WITH HIGH NONLINEARITY, DISPERSION CONTROL AND GAIN

REFERENCE TO RELATED APPLICATION

The present application claims the benefit of U.S. Provisional Patent Application No. 60/516,299, filed Nov. 3, 2003, whose disclosure is hereby incorporated by reference in its entirety into the present disclosure.

FIELD OF THE INVENTION

The present invention is directed to an optical device having an optical fiber and more particularly to such a device in which the fiber is heated and drawn to control at least one of loss, gain, dispersion and nonlinearity. The invention is further directed to a method of making such a fiber.

DESCRIPTION OF RELATED ART

It is well known that optical fibers can be heated and drawn down to sizes much smaller than a typical single-mode fiber. Heating techniques using an electric arc, flame, and $CO_2$ laser absorption have all been shown.

A system for carrying out the $CO_2$ laser absorption technique is shown in FIG. 1. As shown in FIG. 1, light $L_1$ from a $CO_2$ laser 102 at up to 25 W power and light $L_2$ from a helium-neon laser 104 are combined by a beam combiner 106, such as a ZnSe plate, to form a combined light beam L. The combined beam L is reflected by a curved mirror 108 onto a galvanometer mirror or other scanning device 110, which scans the light onto an optical fiber 112 to form a hot zone 114 in which the fiber 112 is heated to a melting temperature. The fiber is held by two stages 116 moving on rails 118. One end of the fiber 112 is passed over a pulley 120, and a small weight 122 provides a fixed amount of tension.

As shown in FIG. 2A, the light L is incident on the fiber 112. Initially, the fiber 112 is thick enough that the heat absorption is much greater than the heat dissipation, so that the fiber is heated to its melting point. However, as shown in FIG. 2B, as the fiber is thinned, the amount of heat absorption decreases until the fiber goes below the melting temperature. As shown in FIG. 3, the result is a fiber 300 having a narrowed portion or taper waist 302 bounded by two taper regions or transition regions 304 that connect the taper waist 302 with non-tapered portions 306 of the fiber 300.

In the taper regions 304, coupling can be lost. Also, in the long-wavelength band (near 1550 nm) where telecommunication is normally carried out, dispersion is anomalous, leading to soliton formation. In a conventional doped optical fiber laser, complex external optical elements are needed to compensate for the normal dispersion of the fiber, thus increasing the size, expense, and complexity of the system. Fiber lasers can be built using separate gain, dispersion and mode-locking elements. It would be desirable to simplify these laser designs by integrating these functions together.

SUMMARY OF THE INVENTION

It will be seen from the above that a need exists in the art for a technique to taper the fiber such that it has the requisite properties regarding loss, gain, dispersion, nonlinearity, or any combination thereof.

It is thus an object of the invention to taper the fiber so that the fiber has the desired dispersion properties and so that external dispersion-correcting elements are not needed.

It is a further object of the invention to taper the fiber to minimize coupling loss in the transition zones.

It is yet a further object of the invention to taper the fiber to cause the fiber to be highly nonlinear.

It is a still further object of the invention to use such a fiber in an optical device that achieves ultrashort pulse generation.

To achieve the above and other objects, the present invention is directed to a method of tapering the fiber in which the formation of the transition regions and of the taper waist is controlled to achieve the desired effects. To minimize loss, the tapering in the transition regions must be adiabatic. That is, the rate of change of the fiber diameter in the axial direction must be small enough that the energy of existing modes is reflected back as little as possible and is coupled as little as possible into other order modes. The criterion for adiabaticity is that the taper angle in the transition regions, namely, the angle between the direction of propagation and the outer surface of each transition region, must be less than the local diffraction angle. To achieve the desired dispersion property, the diameter of the taper waist is selected such that the total dispersion (normal plus anomalous) at a desired wavelength is either zero or the appropriate value for providing zero overall dispersion in the device in which the fiber will be used.

The coefficient of nonlinearity varies inversely with the effective area of the fiber. Thus, a large decrease in the effective area provides high nonlinearity. Experiments have confirmed that the nonlinearity is increased by a factor of approximately twenty relative to a non-tapered fiber.

An important application of the present invention is the use of these tapered structures with doped optical fiber to enable a new class of compact, inexpensive modelocked fiber lasers. In a conventional doped optical fiber laser, complex external optical elements are needed to compensate for the normal dispersion of the fiber. In one variation of the present invention, tapered structures are built into the doped fiber itself, with the taper chosen for optimal net "anomalous" to compensate for the "normal" dispersion of the fiber. This will provide for stable modelocking at a lasing wavelength to create a simple, compact light source, with the loss in the fiber lower than the gain of the laser. A mode-locking device can be introduced into the cavity to cause the formation of short pulses. If a doped PM (polarizing maintaining) fiber is tapered, one can create a PM mode-locked fiber laser. That design offers an advantage over alternative solutions such as intra-cavity prism pairs, because it is an integrated structure which can be fusion spliced at both ends.

The concept can also be applied in an optical amplifier, in which the doped fiber is tapered to provide the dispersion compensation and the laser is pumped in an un-tapered region of the fiber or by using pump light from each end. Such a dispersion-compensated optical amplifier has been reduced to practice using Yb:FIBER with untapered gain of 40 db/m from INO.

Secondary applications of the general concept of a tapered structure in un-doped single mode optical fiber include:
A lossless stand-alone dispersion compensator device element for use in a system to control anomalous dispersion
A super-continuum generator of coherent white light for use in OCT (Optical Coherence Tomography) and for frequency metrology.
A lossless optical logic device for processing optical information.

The concept has been experimentally verified. In a demonstration device, the loss was as low as 2.3 db.

A benefit from the present invention for dispersion compensation in a doped fiber laser is to replace external optics (typically a pair of diffraction gratings), which would be required for a conventional fiber laser. The laser then becomes much more compact and inexpensive by eliminating the large components and the labor required to align them. A significant cost reduction should be expected. Ultra short optical pulses (<1 pico-second) are being used to cut metals, transparent solids and biological tissue, to fabricate structures by absorption in photopolymers, and importantly to repair lithographic masks in semiconductor manufacturing. If the costs can be reduced, femtosecond lasers could compete with other methods of micro- and nanofabrication, because of improved hole size, reduced heat affected zone and precision.

The following publications relate to the invention and are hereby incorporated by reference in their entireties into the present disclosure:

"Linear and Non-linear Properties of Tapered Single-Mode Optical Fibers", by Fei Lu at the Spring Meeting of the Institute of Optics Industrial Associates, Apr. 7, 2003;

"Generation of a broadband continuum with high spectral coherence in tapered single-mode optical fibers", by Fei Lu and Wayne H. Knox, Optics Express 12, No. 2, Jan. 26, 2004; and "Generation of a broadband continuum with high spectral coherence in tapered single-mode optical fibers", by Fei Lu and Wayne H. Knox at the Conference on Lasers and Electro-Optics (CLEO 2004) on May 18, 2004, and in Optics Letters 29, No. 18, Sep. 15, 2004.

BRIEF DESCRIPTION OF THE DRAWINGS

A preferred embodiment of the present invention will be set forth with reference to the drawings, in which.

DETAILED DESCRIPTION OF THE PREFERRED EMBODIMENT

Figure 1:
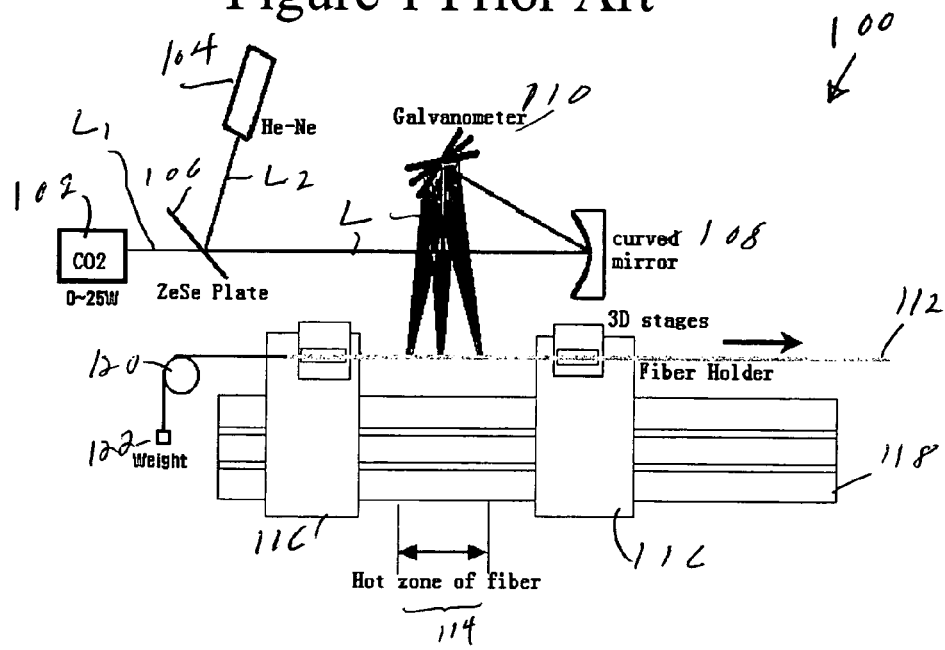
FIG. 1 is a schematic diagram showing a system for tapering an optical fiber.
Figure 2A:
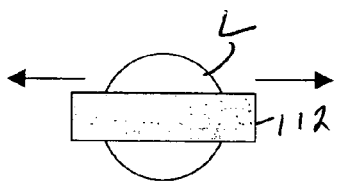
FIG. 2A shows an optical fiber that is being heated by the scanning laser beam of FIG. 1.
Figure 2B:
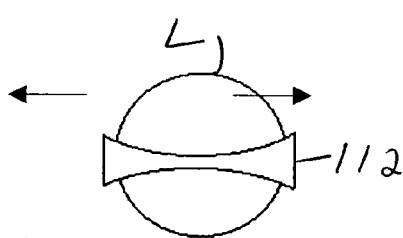
FIG. 2B shows an optical fiber that has narrowed to such an extent that it is no longer heated by the scanning laser beam of FIG. 1.

A preferred embodiment and variations thereon will be disclosed in detail with reference to the drawings, in which like reference numerals refer to like elements or steps throughout.

Figure 4:
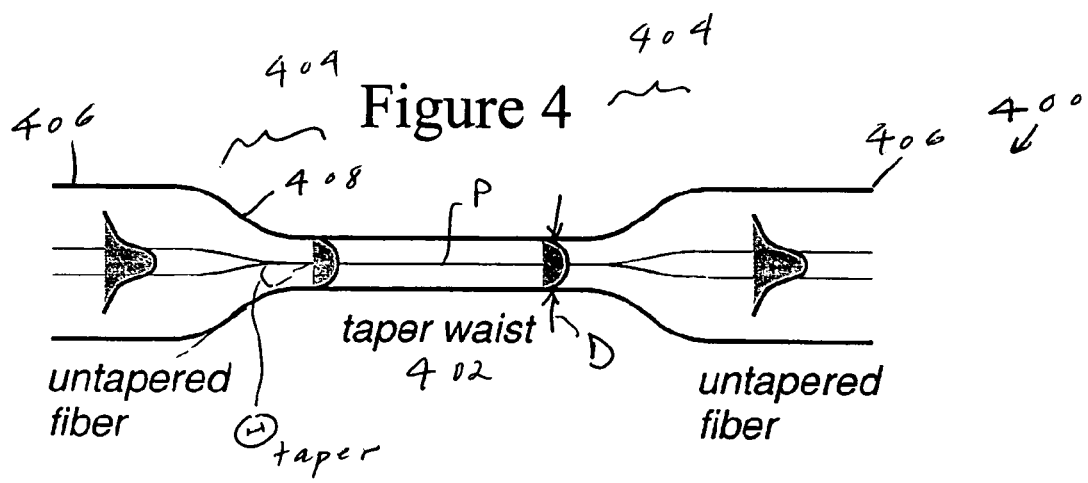
FIG. 4 shows an optical fiber that has been tapered according to the preferred embodiment and in particular illustrates the taper angle and the diameter of the taper waist.

FIG. 4 shows a section of fiber 400 that has been tapered according to the preferred embodiment. The fiber 400 has a narrowed portion or taper waist 402 bounded by two taper regions or transition regions 404 that connect the taper waist 402 with non-tapered portions 406 of the fiber 400.

Figure 3:
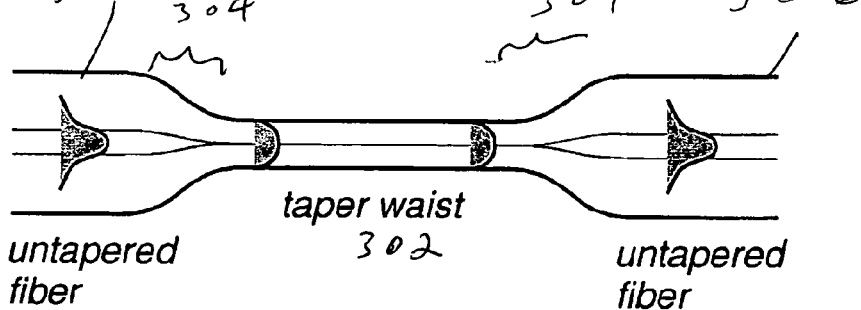
FIG. 3 shows an optical fiber that has been tapered by the system of FIG. 1.

The design parameters distinguishing the fiber 400 of FIG. 4 from the fiber 300 of FIG. 3 are the taper angle $\Theta_{taper}$ and the diameter D of the taper waist 402. Those design parameters can be controlled by suitable control of a tapering system like that of FIG. 1. Those design parameters have the following significance to loss, dispersion and nonlinearity.

Each transition region 404 has a taper angle $\Theta_{taper}$, which is defined as the angle between the outer surface 408 of the transition region 404 and the propagation direction P in the fiber. As noted above, the tapering of the transition regions 404 is adiabatic. Adiabaticity is obtained when the change of fiber diameter is slow enough in the axial direction so that the energy of existing modes reflected back is minimized and is coupled as little as possible to other order modes. The criterion for adiabaticity is that the taper angle must be less than the angle of diffraction, $\Theta_{taper} < \Theta_{diff}$. The angle of diffraction $\Theta_{diff}$ is given by $$\Theta_{diff} = \frac{1.22\lambda}{d}, \quad (1)$$

where $\lambda$ is the wavelength of the laser light and d is the diameter of the mode size inside the fiber. In order to realize adiabatic tapering, the tapering angle should be much smaller than the diffraction angle.

The relevance of the diameter D to dispersion will be explained with reference to FIGS. 5 and 6. The net dispersion (the net of normal dispersion minus the anomalous dispersion) as a function of wavelength in an optical fiber of a given diameter can be calculated by numerically solving the following eigenvalue equation for $\beta$, the propagation constant of the mode inside the fiber:

$$\left[\frac{J'_m(\kappa a)}{\kappa J_m(\kappa a)} + \frac{K'_m(\gamma a)}{\gamma K_m(\gamma a)}\right]\left[\frac{J'_m(\kappa a)}{\kappa J_m(\kappa a)} + \frac{n_2^2}{n_1^2}\frac{K'_m(\gamma a)}{\gamma K_m(\gamma a)}\right] = \left(\frac{m\beta k_0(n_1^2 - n_2^2)}{an_1\kappa^2\gamma^2}\right) \quad (2)$$

where:

$$\kappa^2 + \gamma^2 = (n_1^2 - n_2^2)k_0^2. \quad (3)$$

The second derivative of $\beta$ is the group velocity dispersion $\beta_2$.

$$\beta_2 = \left(\frac{d^2\beta}{d\omega^2}\right). \quad (4)$$

Figure 5:
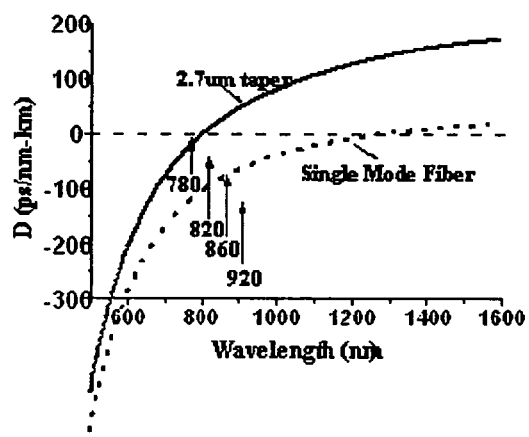
FIG. 5 shows the results of dispersion calculation for two fiber diameters.

The results of such dispersion calculations for two fiber diameters are shown in FIG. 5. More specifically, FIG. 5 shows a calculation for both a conventional 125 µm diameter single mode fiber (dashed line) and a tapered section with a diameter of 2.7 µm (solid line). The figure shows that the dispersion goes to zero for a wavelength around 780 nm for the 2.7 µm fiber, and hence a fiber laser with a taper waist of 2.7 µm operating at 780 nm would have dispersion controlled such that the net dispersion is zero.

Figure 6:
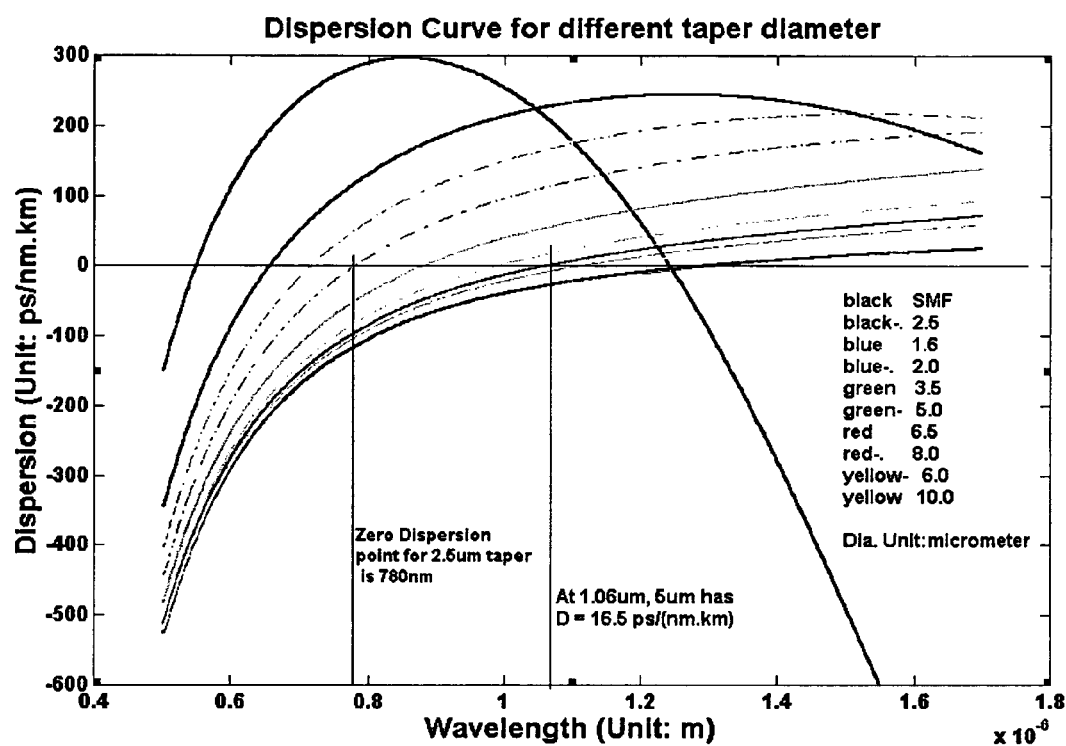
FIG. 6 shows a set of dispersion curves for multiple taper diameters.

From a set of dispersion curves such as those of FIG. 6, one can select the waist diameter which delivers the amount of positive or negative (i.e., non-zero) dispersion needed for complete dispersion control in the final integrated fiber optic device. Given the needed amount of positive or negative dispersion and the wavelength at which the final integrated fiber optic device will be operated, an appropriate dispersion curve can be chosen from FIG. 6, and D can be selected accordingly. Alternatively, a numerical calculation can be performed for D.

Another significant result of creating a tapered region or regions within a fiber device is to increase the effective nonlinearity. The degree of that increase can be determined from the nonlinearity coefficient, which is $$\gamma = n_2 \omega_o / C A_{eff},\qquad(5)$$

where $A_{eff}$, the effective area decrease, is large in these tapered fibers. While nonlinearity is about 4 (1/W*km) in ordinary 125 µm fiber, in a tapered fiber of 2.7 µm diameter, $\gamma$ is 80 (1/W*km). Thus, non-linearity is increased by about a factor of 20.

Some applications of the fiber tapered in accordance with the preferred embodiment will now be disclosed.

Figure 7:
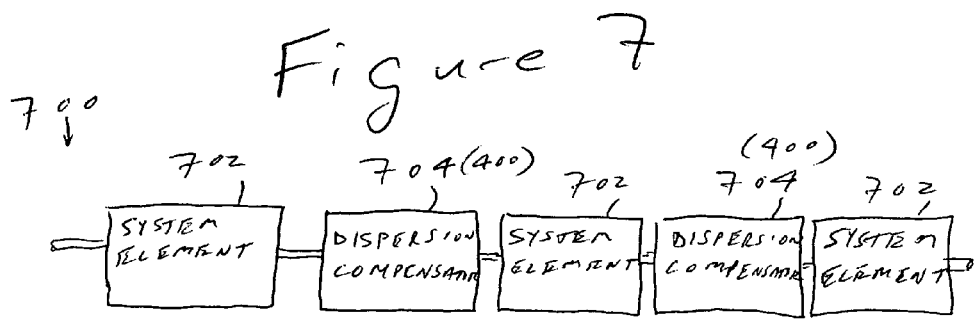
FIG. 7 is a schematic diagram showing a generic fiber optic system using the tapered fiber of FIG. 4 as a dispersion compensator.

FIG. 7 is a block diagram showing a generic fiber optic system 700. Those skilled in the art who have reviewed the present disclosure will readily appreciate that the system 700 can be any fiber optic system having need of dispersion compensation and that the system elements 702 can be any system elements used in such a system. The narrowed fibers 400 of FIG. 4 are used in the system 700 as dispersion compensators 704, which can be treated as "black box" elements and can be introduced anywhere in the system as needed.

The dispersion compensators 704 can be passive optical elements. Alternatively, as explained below, the dispersion compensators 704 can be made from doped optical fibers and can be pumped to operate as active optical elements such as amplifiers or lasers.

Figure 8:
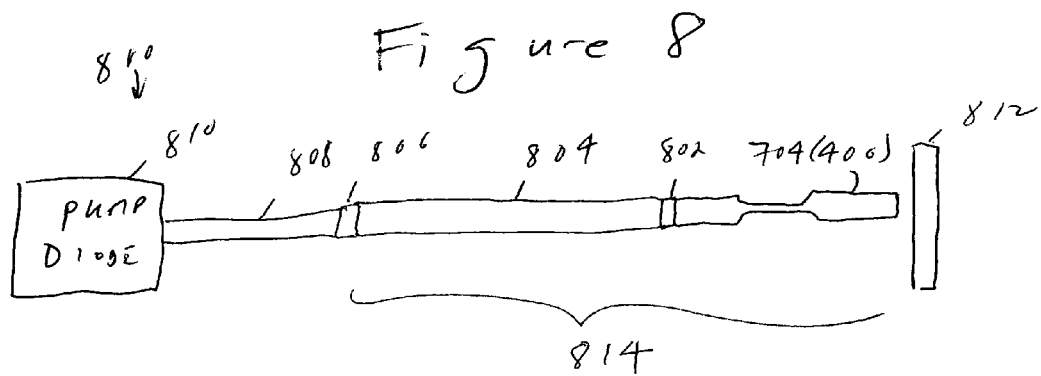
FIG. 8 is a schematic diagram showing a fiber laser using the tapered fiber of FIG. 4 as a dispersion compensator.

FIG. 8 is a schematic diagram showing a laser 800 in which the dispersion compensator 704 is spliced through a fusion splice 802 to a gain fiber 804, which is an ordinary doped optical fiber with normal dispersion. The gain fiber 804 is coupled through an output coupler 806 to another length of fiber 808 and thence to a pump diode 810 or other suitable pump light source. At the other end of the laser 800 is a semiconductor modulation or saturable absorber device 812. The laser 800 thus defines a laser cavity 814 in which the dispersion compensator 704 and the gain fiber 804 are located.

The dispersion compensator 704 compensates for dispersion in other elements, including the gain fiber 804. The loss caused by the taper is lower than the gain from the gain fiber. A mode-locking device (not shown) can be introduced into the laser cavity 814 to form short pulses.

Thus, traditional dispersion compensation elements, such as pairs of prisms or of diffraction gratings inside the laser cavity, are not required. Thus, the laser 800 offers advantages in terms of reduced complexity, size and cost. Also, since the laser 800 is an integrated device and can be fusion-spliced at both ends, it exhibits very low PMD and PDL.

Alternatively, the tapered optical fiber 400 of FIG. 4 can itself be doped. In such a fiber, a positive net gain (gain−loss>0) can be achieved by optically pumping one or both of the non-tapered portions 406. Pumping both of the non-tapered portions 406 results in a significant net gain.

In the generic fiber optic system 700 of FIG. 7, if the dispersion compensators 704 are implemented with doped fibers as just described, those dispersion compensators 704 can function as dispersion-compensated amplifiers, that is, as elements that amplify an optical signal without dispersion.

A tapered doped fiber has a large absorption band or bands. The advantages of tapering a doped optical fiber were not realized until the present invention.

Figure 9:
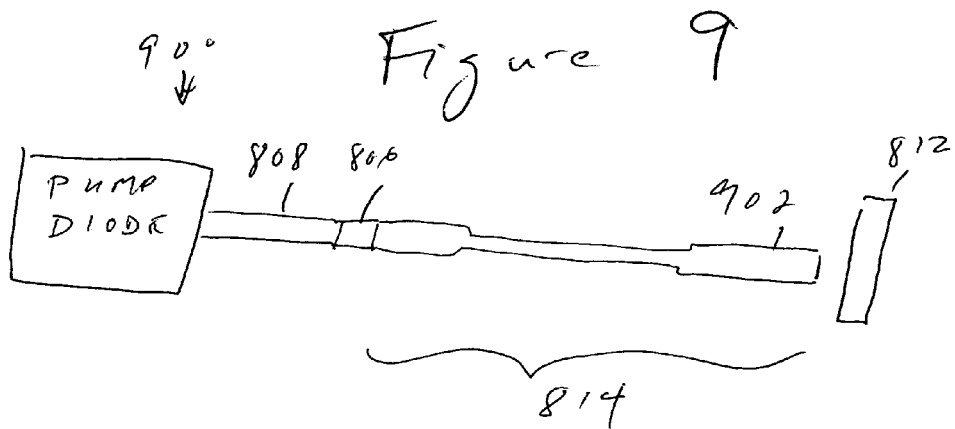
FIG. 9 is a schematic diagram showing a fiber laser using the tapered fiber of FIG. 4 as both a dispersion compensator and a gain fiber.

Furthermore, the laser 800 of FIG. 8 can be redesigned to replace the dispersion compensator 704 and the gain fiber 804 with a single tapered doped fiber that performs both functions and that exhibits optimal net anomalous dispersion for stable mode loading at the lasing wavelength. Such a laser is shown in FIG. 9 as 900, in which a single tapered doped fiber 902 replaces the dispersion compensator 704, the fusion splice 802 and the gain fiber 804 in the laser cavity 814.

Still other modifications can be implemented. For example, the fiber 400 of FIG. 4 can be formed from a polarization-maintaining (PM) fiber, doped or undoped. If the PM fiber is doped, it can be used in a PM mode-locked fiber laser. A photonic crystal fiber, doped or undoped, can also be used.

The present invention has particular utility in achieving ultrashort pulse generation. In a system such as that of FIG. 7, one of the optical system elements is a laser that generates a series of light pulses in the tapered optical fiber. The diameter D is provides sufficient nonlinearity in the tapered optical fiber to achieve mode locking.

Yet another utility of a system such as that of FIG. 7 is as an ultrafast optical logic device, particularly a cascaded optical logic device. In an optical logic device, a signal having a particular polarization is received, and another signal can be received to change the polarization of the first signal to set the first signal to a logical ON or OFF state.

In the art, the use of tapered optical fibers has introduced losses into optical logic elements. In particular, in a cascaded optical logic element, such losses are also cascaded. Thus, the overall loss may well be excessive.

The present invention allows a solution to that problem. The tapered optical fibers of the present invention permit loss to be minimized. If the optical fibers are doped and pumped, they can cause a gain that cancels out the loss or even exceeds the loss to permit a net gain.

While a preferred embodiment of the present invention and certain variations and uses thereof have been set forth in detail above, those skilled in the art who have reviewed the present disclosure will readily appreciate that other embodiments can be realized within the scope of the present invention. For example, numerical examples are illustrative rather than limiting, as are examples of specific materials. Also, any suitable technique for tapering the fiber can be used, provided that it can be controlled to achieve the desired parameters for the tapered fiber. Therefore, the present invention should be construed as limited only by the appended claims.

What is claimed is:

1. A method for producing a tapered optical fiber, the method comprising:
    (a) providing a non-tapered optical fiber;
    (b) tapering a portion of the non-tapered optical fiber to form the tapered optical fiber to comprise a taper waist, a transition region on either side of the taper waist, and non-tapered portions on sides of the transition regions remote from the taper waist, wherein each of the transition regions has an outer surface at a taper angle relative to a direction of propagation of light through the tapered optical fiber; and
    (c) controlling step (b) so that in each of the transition regions, the taper angle is less than a local diffraction angle in the tapered optical fiber.

2. The method of claim 1, wherein the taper waist has a diameter, and further comprising:
    (d) selecting a wavelength of light at which the tapered optical fiber will be used;
    (e) selecting a dispersion characteristic that the tapered optical fiber will have at the wavelength selected in step (d); and
    (e) controlling step (b) so that the diameter of the taper waist provides the dispersion characteristic selected in step (e) at the wavelength selected in step (d).

3. The method of claim 2, wherein the dispersion characteristic selected in step (e) is zero dispersion at the wavelength selected in step (d).

4. The method of claim 2, wherein the dispersion characteristic selected in step (e) is a predetermined non-zero dispersion at the wavelength selected in step (d).

5. The method of claim 2, wherein the non-tapered optical fiber provided in step (a) is a doped optical fiber.

6. The method of claim 5, wherein the doped optical fiber is a polarization-maintaining doped optical fiber.

7. The method of claim 1, wherein the non-tapered optical fiber provided in step (a) is a doped optical fiber.

8. The method of claim 7, wherein the doped optical fiber is a polarization-maintaining doped optical fiber.

9. A method for producing a tapered optical fiber, the method comprising:
    (a) providing a non-tapered optical fiber;
    (b) tapering a portion of the non-tapered optical fiber to form the tapered optical fiber to comprise a taper waist, a transition region on either side of the taper waist, and non-tapered portions on sides of the transition regions remote from the taper waist, wherein the taper waist has a diameter;
    (c) selecting a wavelength of light at which the tapered optical fiber will be used;
    (d) selecting a dispersion characteristic that the tapered optical fiber will have at the wavelength selected in step (c); and
    (e) controlling step (b) so that the diameter of the taper waist provides the dispersion characteristic selected in step (d) at the wavelength selected in step (c).

10. The method of claim 9, wherein the dispersion characteristic selected in step (d) is zero dispersion at the wavelength selected in step (c).

11. The method of claim 9, wherein the dispersion characteristic selected in step (d) is a predetermined non-zero dispersion at the wavelength selected in step (c).

12. The method of claim 9, wherein the non-tapered optical fiber provided in step (a) is a doped optical fiber.

13. The method of claim 12, wherein the doped optical fiber is a polarization-maintaining doped optical fiber.

14. A fiber optic system comprising:
    a plurality of optical system elements which communicate with one another using light at a wavelength such that a first dispersion is introduced into the light; and
    a tapered optical fiber connecting at least two of the plurality of optical system elements, the tapered optical fiber having a taper waist with a diameter selected so that the tapered optical fiber introduces a second dispersion into the light, wherein the second dispersion cancels out the first dispersion.

15. The fiber optic system of claim 14, wherein the tapered optical fiber further comprises a transition region on either side of the taper waist, wherein each of the transition regions has an outer surface at a taper angle relative to a direction of propagation of light through the tapered optical fiber, wherein the taper angle is less than a local diffraction angle in the tapered optical fiber.

16. The fiber optic system of claim 15, wherein the tapered optical fiber is a passive optical element.

17. The fiber optic system of claim 15, wherein the tapered optical fiber is doped and pumped to function as an active optical element.

18. The fiber optic system of claim 17, wherein the tapered optical fiber is a polarization-maintaining doped optical fiber.

19. The fiber optic system of claim 17, wherein the active optical element comprises an amplifier.

20. The fiber optic system of claim 17, wherein the active optical element comprises a laser.

21. The fiber optic system of claim 15, wherein:
    the plurality of optical system elements comprise a laser for generating a series of light pulses in the tapered optical fiber; and
    the diameter of the taper waist provides sufficient non-linearity in the tapered optical fiber to achieve mode locking.

22. A tapered optical fiber comprising:
    a taper waist;
    a transition region on either side of the taper waist; and
    non-tapered portions on sides of the transition regions remote from the taper waist;
    wherein each of the transition regions has an outer surface at a taper angle relative to a direction of propagation of light through the tapered optical fiber, the taper angle being less than a local diffraction angle in the tapered optical fiber.

23. The tapered optical fiber of claim 22, wherein the tapered optical fiber is a doped optical fiber.

24. The tapered optical fiber of claim 23, wherein the tapered optical fiber is a polarization-maintaining doped optical fiber.

25. A fiber optic laser comprising:
    a plurality of optical elements defining a laser cavity;
    a pumping light source for introducing pumping light into the laser cavity;
    a gain fiber in the laser cavity for receiving the pumping light and for producing laser light, the gain fiber introducing a first dispersion into the laser light; and
    a tapered optical fiber in the laser cavity, the tapered optical fiber comprising a taper waist with a diameter selected to introduce a second dispersion into the laser light, the second dispersion canceling out the first dispersion.

26. The fiber optic laser of claim 25, wherein the tapered optical fiber further comprises a transition region on either side of the taper waist, wherein each of the transition regions has an outer surface at a taper angle relative to a direction of propagation of light through the tapered optical fiber, wherein the taper angle is less than a local diffraction angle in the tapered optical fiber.

27. The fiber optic laser of claim 26, wherein:
the gain fiber introduces a gain into the laser light;
the tapered optical fiber introduces a loss into the laser light; and
the loss is less than the gain, thereby providing a net gain.

28. The fiber optic laser of claim 25, wherein the tapered optical fiber is part of the gain fiber.

29. The fiber optic laser of claim 28, wherein the tapered optical fiber is a polarization-maintaining doped optical fiber.

30. The fiber optic laser of claim 25, wherein the tapered optical fiber is a separate optical element from the gain fiber and is provided in series with the gain fiber.

31. The fiber optic laser of claim 30, wherein the tapered optical fiber is connected to the gain fiber through a fusion splice.

32. A fiber optic system for generating a supercontinuum of light, the fiber optic system comprising:
a tapered optical fiber comprising a taper waist; and
a laser for introducing a series of light pulses into the tapered optical fiber;
wherein the diameter of the taper waist provides sufficient nonlinearity in the tapered optical fiber to achieve supercontinuum, wherein the tapered optical fiber further comprises a transition region on either side of the taper waist, wherein each of the transition regions has an outer surface at a taper angle relative to a direction of propagation of light through the tapered optical fiber, wherein the taper angle is less than a local diffraction angle in the tapered optical fiber.

33. An optical logic element comprising:
a plurality of optical logic components; and
a tapered optical fiber interconnecting at least two of said plurality of optical logic components, wherein the tapered optical fiber comprises a taper waist and a transition region on either side of the taper waist, wherein each of the transition regions has an outer surface at a taper angle relative to a direction of propagation of light through the tapered optical fiber, wherein the taper angle is less than a local diffraction angle in the tapered optical fiber.

34. The optical logic element of claim 33, wherein the tapered optical fiber is a doped optical fiber.

35. The optical logic element of claim 34, wherein the doped optical fiber is a polarization-maintaining optical fiber.

36. The optical logic element of claim 34, wherein the doped optical fiber is pumped to provide a net gain.

* * * * *